United States Patent [19]

Tharman et al.

[11] Patent Number: 5,050,371
[45] Date of Patent: Sep. 24, 1991

[54] LAWNMOWER IGNITION SHUT-OFF SWITCH

[75] Inventors: Paul A. Tharman; John C. Schmit, both of Milwaukee, Wis.

[73] Assignee: Briggs & Stratton, Wauwatosa, Wis.

[21] Appl. No.: 586,533

[22] Filed: Sep. 21, 1990

[51] Int. Cl.⁵ .............................................. A01D 75/20
[52] U.S. Cl. ..................................................... 56/10.5
[58] Field of Search ...................... 56/10.5, 10.8, 11.3; 123/179 SE

[56] References Cited

U.S. PATENT DOCUMENTS

| | | | |
|---|---|---|---|
| 3,985,196 | 10/1976 | Deschamps | 56/10.5 X |
| 4,044,532 | 8/1977 | Lessig, III | 56/10.5 |
| 4,433,530 | 2/1984 | Schaefer | 56/10.5 X |

Primary Examiner—Thuy M. Bui
Attorney, Agent, or Firm—Andrus, Sceales, Starke & Sawall

[57] ABSTRACT

An adjustable ignition shut-off switch for lawnmower engines is disclosed in which a tab attached to the bale lever moves a resilient switch contact away from a ground terminal when the lawnmower is in its run position. When the bale lever is released, the tab disengages the switch contact, permitting the resilient switch contact to make an electrical connection with the ground terminal. Since the switch contact is also electrically connected to the engine ignition system, ignition pulses are grounded to stop the engine when the switch contact is electrically connected to the ground terminal. The height of the tab is adjustable so that the shut-off switch may be adapted to different lawnmower applications.

12 Claims, 1 Drawing Sheet

LAWNMOWER IGNITION SHUT-OFF SWITCH

BACKGROUND OF THE INVENTION

This invention relates to lawnmowers, and more particularly to switches for shutting off or killing lawnmower engine ignition systems.

According to regulations of the Consumer Product Safety Commission (CPSC), the rotating lawnmower cutting blade must stop within three seconds of the time that a safety lever or switch is released. To comply with this requirement, lawnmowers have typically been designed with a rotatable bale lever which is gripped and held by the operator along with a fixed handle member when the lawnmower is operating.

To stop the lawnmower, the bale lever is released. When the bale lever is released, it typically engages a switch that stops engine ignition as well as a brake and/or clutch mechanism that stops the rotating blade.

Many types of switches are known for stopping engine ignition once the bale lever is released. These switches are often complicated and are non-adjustable, so that they cannot be adapted to particular lawnmower applications.

SUMMARY OF THE INVENTION

A lawnmower engine ignition system shut-off switch is disclosed that is adjustable for different lawnmower applications, and that uses the movement of the bale lever relative to the lawnmower handle member to ground ignition pulses.

In a preferred embodiment, the shut-off switch includes a ground terminal attached to and in electrical connection with the lawnmower, a flexible switch contact in electrical connection with the engine ignition system via a wire, and a tab means attached to the bale lever for moving the flexible switch contact away from the ground terminal to prevent grounding of the engine ignition system when the bale lever is in its run position.

When the bale lever is released so that it is in its stop position, the tab means moves away from the flexible switch contact, allowing the flexible contact to make an electrical connection with the ground terminal and thereby ground ignition pulses to shut off the engine.

Also in a preferred embodiment, the tab means includes an insulated member whose height is adjustable to enable the switch to be adapted to particular lawnmower applications. The insulated member may be a threaded, insulated bolt which engages a threaded hole located on a shoulder attached to the bale lever. The bolt is rotated in the threaded hole to adjust its height.

The flexible switch contact is preferably an elongated insulated wire having a first non-insulated end that is in electrical connection with the engine ignition system, and a second non-insulated end that is adapted to make electrical contact with the ground terminal when the lawnmower is in its stop position. The ground terminal is preferably an electrically-conductive plate attached to the lawnmower handle member.

Additional features and advantages of the present invention will be apparent to those skilled in the art from the following detailed description and the attached drawings, in which:

DETAILED DESCRIPTION OF PREFERRED EMBODIMENTS

Figure 1:
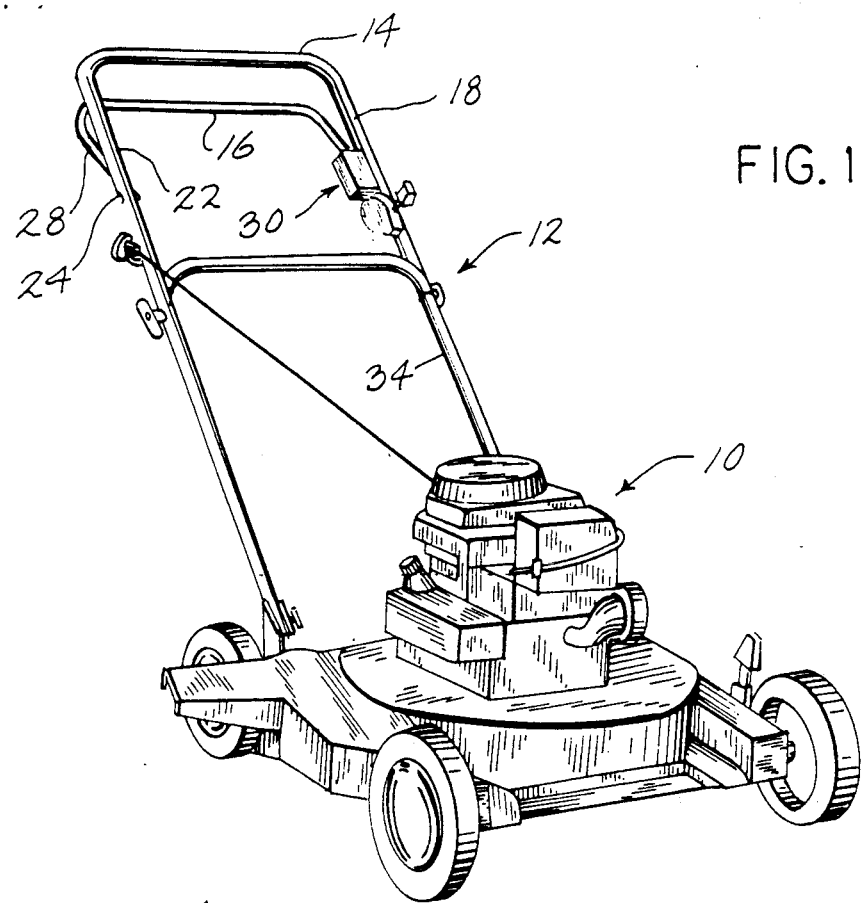
FIG. 1 is a perspective view of a lawnmower incorporating the ignition shut-off switch according to the present invention.

FIG. 1 is a perspective view of a lawnmower 10 incorporating the present invention. In FIG. 1, lawnmower 10 includes a handle assembly 12 for guiding the lawnmower. Handle assembly 12 comprises a U-shaped handle member 14 and a bale lever 16 rotatably connected to handle member 14. The U-shaped handle member 14 has a first leg 18 that includes a first leg aperture 20 (FIGS. 2 and 3) and an opposing second leg 22 having a second leg aperture 24. Bale lever 16 has a first end 26 (FIGS. 2 and 3) that rotatably engages first leg aperture 20. Bale lever 16 also has an opposite second lever end 28 that rotatably engages second leg aperture 24. A brake and/or clutch cable (not shown) may have one end attached to bale lever 16, and its other end interconnected with a brake and/or clutch assembly.

Bale lever 16 is rotatable between a run position and a stop position. When bale lever 16 is in its run position (FIG. 3), lever 16 is simultaneously gripped with handle member 14 by the lawnmower operator. When the operator wishes to stop the rotating cutting blade and the the lawnmower engine, he releases bale lever 16, causing lever 16 to rotate in a generally downward direction to its stop position. The stop position of bale lever 16 is depicted in FIGS. 1 and 2.

In the present invention, the relative movement of the bale lever 16 with respect to handle member deactivates an ignition shut-off switch 30 when the bale lever is in its run position. Shut-off switch 30 is activated to ground ignition pulses and thereby shut off the engine as described below when bale lever 16 rotates in a generally downward direction to its stop position.

Figures 2, 3:
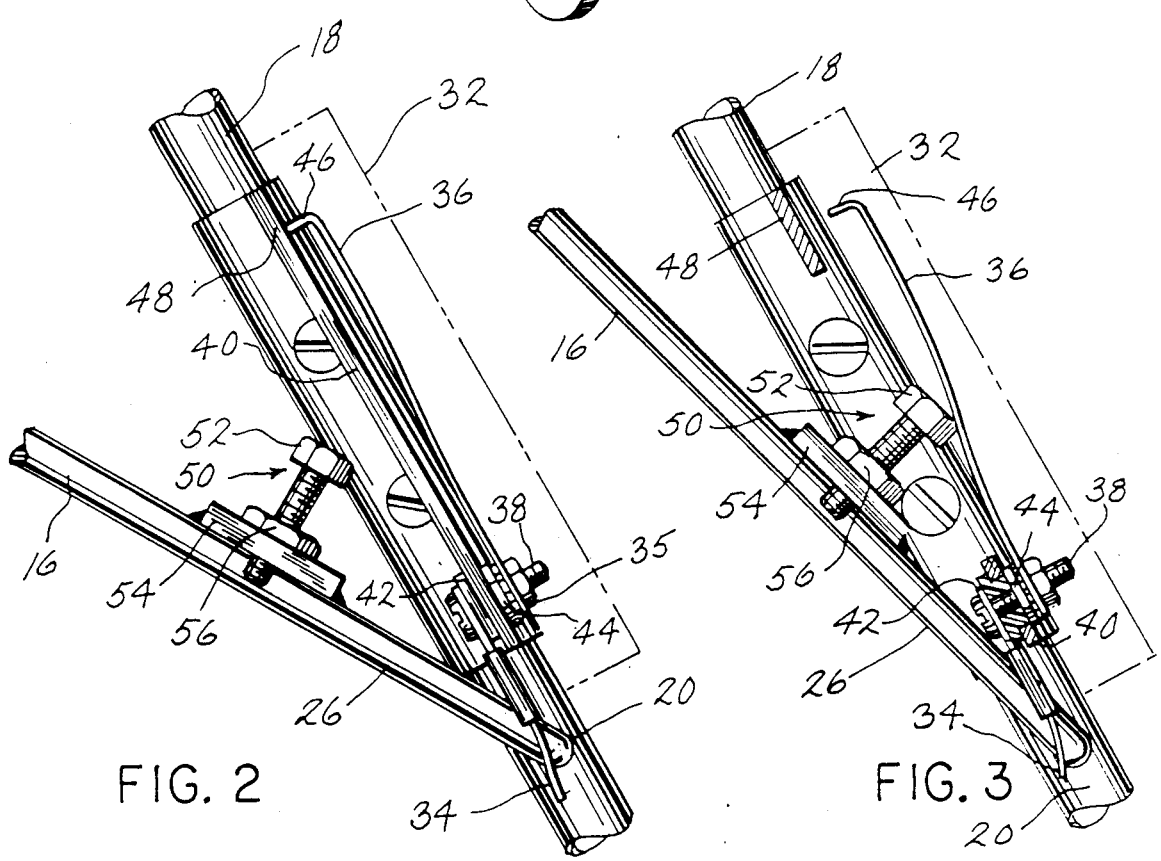
FIG. 2 is a side sectional view depicting the switch components when the lawnmower and the bale lever are in the stop position.
FIG. 3 is a side sectional view depicting the switch components when the lawnmower and the bale lever are in the run position.

FIGS. 2 and 3 depict the internal components of switch 30 according to the present invention. In FIGS. 2 and 3, the components of switch 30 are contained in a housing 32 designed to protect the switch components from the environment. An ignition wire 34 is electrically connected to a first non-insulated end 35 of an elongated, flexible insulated switch contact 36 via a metal bolt 38 that passes through a metal plate 40 (FIG. 2) attached to first handle leg 18. Wire 34 is electrically isolated from plate 40 by an insulated nut 42. Similarly, non-insulated first end 35 of flexible contact 36 is electrically isolated from plate 40 by an insulated nut 44.

The opposite second end 46 of flexible contact 36 is also not insulated, and is designed to make an electrical connection with ground terminal 48 when bale lever 16 is in its stop position as depicted in FIG. 2. Ground terminal 48 is preferably a metal plate attached to handle leg 18.

A tab means 50 is attached to bale lever 16 and is designed to move flexible switch contact 36 away from ground terminal 48 to prevent grounding of the engine ignition system when bale lever 16 is in its run position.

Tab means 50 may have a wide variety of configurations as long as it achieves its function of moving flexible contact 36 and particularly second end 46 away from ground terminal 48.

In a preferred embodiment, tab means 50 includes a threaded, insulated bolt 52 which threadably engages a tab plate 54 attached to bale lever 16. The use of a threaded bolt 52 enables the height of the tab means to be adjusted depending upon the particular lawnmower application. The height of bolt 52 is set and fixed by a lock nut 56.

Shut-off switch 30 operates in the following manner. When bale lever 16 is in its stop position as depicted in FIG. 2, engine ignition signals travel from the ignition system (not shown) via ignition wire 34 through flexible contact 36, through second wire end 46, and are grounded at ground terminal 48. When the ignition pulses are grounded, the engine stops running.

When bale lever 16 is in its run position as depicted in FIG. 3, the upward rotation of lever 16 causes bolt 52 to push flexible contact 36 and second wire end 46 away from ground terminal 48, thereby preventing grounding of the engine ignition system. The engine continues to run until the ignition pulses are grounded.

Although a preferred embodiment of the present invention has been shown and described, other embodiments will be apparent to those skilled in the art and are within the scope of the present invention. For example, flexible switch contact 36 could be replaced by any type of electrically-conductive resilient member. Also, tab means 50 need not be adjustable, but could have a preset height. All of the components in switch 30 could be replaced by a microswitch having a flexible switch contact and still be within the intended scope of the present invention. Therefore, the scope of the present invention is to be limited only by the following claims.

We claim:

1. A lawnmower engine ignition system shut-off switch, said lawnmower including a handle assembly having a handle member and a bale lever that engages said handle member, said bale lever moving relative to said handle member between a run position and a stop position, said switch comprising:

a ground terminal attached to and in electrical connection with said lawnmower;
   a flexible switch contact in electrical connection with said engine ignition system; and
   tab means attached to said bale lever for moving said flexible switch contact away from said ground terminal to prevent the grounding of said engine ignition system when said bale lever is in its run position.

2. The shut-off switch of claim 1, wherein said tab means includes an insulated member.

3. The shut-off switch of claim 1, wherein said flexible switch contact includes an elongated insulated, wire.

4. The shut-off switch of claim 3, wherein said elongated insulated wire has a first non-insulated wire end in electrical connection with said engine ignition system, and a second non-insulated wire end adapted to make electrical contact with said ground terminal.

5. The shut-off switch of claim 1, wherein said ground terminal is attached to and is in electrical connection with said handle member.

6. The shut-off switch of claim 1, wherein said bale lever rotatably engages said handle member.

7. The shut-off switch of claim 1, wherein said handle member is substantially shaped like an inverted U having first and second opposing legs.

8. The shut-off switch of claim 7, wherein said first leg has a first leg aperture and said second leg has a second leg aperture, and wherein said bale lever has a first lever end that rotatably engages said first leg aperture, and said bale lever has an opposite second lever end that rotatably engages said second leg aperture.

9. The shut-off switch of claim 1, wherein the height of said tab means is adjustable.

10. The shut-off switch of claim 9, wherein said adjustable tab means includes a threaded member.

11. The shut-off switch of claim 10, wherein said adjustable tab means includes a threaded, insulated bolt.

12. The shut-off switch of claim 1, wherein said ground terminal includes an electrically-conductive plate.

* * * * *